United States Patent [19]

Watanabe et al.

[11] Patent Number: 5,069,754

[45] Date of Patent: Dec. 3, 1991

[54] PAPERMAKING METHOD

[75] Inventors: Naotaka Watanabe, Tokyo; Takeo Arai, Yokohama; Hitoshi Fujiyoshi, Yokohama; Masako Shirota, Yokohama, all of Japan

[73] Assignee: Mitsui-Cyanamid, Ltd., Tokyo, Japan

[21] Appl. No.: 481,051

[22] Filed: Feb. 16, 1990

[30] Foreign Application Priority Data

Feb. 27, 1989 [JP] Japan .................................. 1-43094

[51] Int. Cl.$^5$ ............................................. D21H 17/44
[52] U.S. Cl. ............................ 162/168.2; 162/168.3; 162/169
[58] Field of Search .................. 162/168.2, 169, 164.6, 162/168.1, 164.7, 168.7, 168.3; 524/460

[56] References Cited

U.S. PATENT DOCUMENTS

| | | | |
|---|---|---|---|
| 2,668,111 | 2/1954 | Lindquist | 162/169 |
| 4,187,142 | 2/1980 | Pickelman et al. | 162/168.3 |
| 4,189,345 | 2/1980 | Foster et al. | 162/168.1 |
| 4,426,470 | 1/1984 | Wessling et al. | 162/168.1 |
| 4,806,591 | 2/1989 | Probst et al. | 162/168.2 |

FOREIGN PATENT DOCUMENTS

| | | |
|---|---|---|
| 57-106798 | 7/1982 | Japan . |
| 58-186696 | 10/1983 | Japan . |
| 61-225394 | 10/1986 | Japan . |
| 61-261302 | 11/1986 | Japan . |
| 1-146907 | 6/1989 | Japan . |

*Primary Examiner*—Peter Chin
*Attorney, Agent, or Firm*—Wenderoth, Lind & Ponack

[57] ABSTRACT

A method of preparing a paper having a reinforced strength wherein a polymer latex is added to a paper stock in an amount of from 2.5 to 30% by weight. The polymer latex is prepared by neutralizing a seed polymer with an acid or a salt or by quaternizing it with a quaternizing agent. The surfaces of the emulsion grains are provided with a large number of cationic groups. The seed polymer is formed by adding a monomer represented by the following formula (I) or a mixture of the monomer (I) and copolymerizable ethylenic unsaturated monomer(s) (II) to a seed latex of a carboxyl-modified synthetic rubber latex or synthetic resin emulsion and polymerizing them:

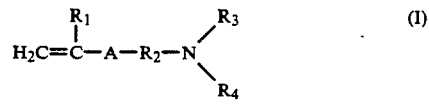

(I)

$R_1$ represents H or $CH_3$; $R_2$ represents an alkylene group having from 2 to 5 carbon atoms;
$R_3$ and $R_4$ each represents H or an alkyl group having from 1 to 5 carbon atoms;
A represents

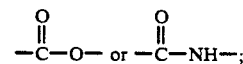

and
$R_1$, $R_3$ and $R_4$ are so selected that the monomer is hardly soluble or insoluble in water.

The paper has a noticeably improved paper-strength.

5 Claims, No Drawings

PAPERMAKING METHOD

FIELD OF THE INVENTION

The present invention relates to a method of preparing a paper having a reinforced strength, where a latex emulsion having a cationic-anionic amphoteric functional group and having a amphoteric ion-complex structure is added to the paper stock.

BACKGROUND OF THE INVENTION

As the polymer latex (or emulsion) usable as an additive to the paper stock in papermaking, an anionic substance is generally known. In this case, it is necessary that the polymer latex be employed along with aluminum sulfate or a cationic water-soluble polymer whereby the latex grains are coagulated and coarsened to be well fixed to the paper stock.

Japanese Patent Application Laid-Open No. 61-261302 mentions cationic polymer latexes.

As opposed to this, the applicant's Japanese Patent Application No. 62-304460 mentions a polymer latex of composite structure having amphoteric ions as distributed very densely on the surfaces of the emulsion grains.

The polymer latex to be employed as an additive to a paper stock is required to have higher fixability and also have higher bindability and adhesiveness to fibers or a filler, because of the economics.

The latex to be employed in the method of the present invention has amphoteric ions at the same time and displays a cationic property on the average. Accordingly, it not only has a function of adsorbing to fibers or a filler but also an interaction between the latex grains themselves. Therefore, has an excellent self-fixability even though it is not combined with an additional fixing agent such as aluminum sulfate or a cationic water-soluble polymer.

SUMMARY OF THE INVENTION

The paper to be prepared by the papermaking method of the present invention has noticeably improved bursting-resistance, tensile strength, bending-resistance and tear strength. In particular, when a small amount of the polymer latex of the invention is added to a paper stock for preparing a high filler-containing paper which often has a lowered strength, the paper obtained may have an improved paper strength.

In addition, the polymer latex of the present invention is also effective for noticeably improving the interlayer-peeling strength in a laminate-structural paper. Moreover, in accordance with the present invention, there is provided a method of preparing excellent papers with good hand, high gas-permeability and sufficient adhesiveness, and the producibility of the method of the invention is high.

This invention will now be described as follows:

1. A method of preparing a paper having a reinforced strength is provided wherein a polymer latex is added to a paper stock in an amount of from 2.5 to 30% by weight, which is characterized by the fact that the polymer latex is one prepared by neutralizing a seed polymer with an acid or a salt or by quaternizing it with a quaternizing agent, the surfaces of the emulsion grains thereby having a high number of cationic groups, where the seed polymer is formed by adding a monomer as represented by the following formula (I) or a mixture of the monomer (I) and copolymerizable ethylenic unsaturated monomer(s) (II) to a seed latex of a carboxyl-modified synthetic rubber latex or synthetic resin emulsion and polymerizing them:

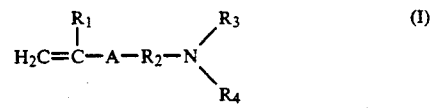

in which
 $R_1$ represents H or $CH_3$;
 $R_2$ represents an alkylene group having from 2 to 5 carbon atoms;
 $R_3$ and $R_4$ each represent H or an alkyl group having from 1 to 5 carbon atoms;
 A represents

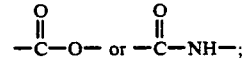

and
 $R_1$, $R_3$ and $R_4$ are so selected that the monomer is hardly soluble or insoluble in water.

2. The above method may employ an amount of the monomer of the formula (I) which corresponds to the colloid-equivalent value (absolute value) of the carboxyl-modified latex or more.

3. In the above method of preparing a paper having a reinforced strength, a polymer latex may be added to a paper stock in an amount of from 2.5 to 30% by weight, wherein the polymer latex has a large number of cationic groups and is prepared by neutralizing a seed polymer with an acid or a salt or by quaternizing it with a quaternizing agent whereby the surfaces of the emulsion grains is provided with a larger number of cationic groups.

The seed polymer obtained by polymerizing a seed latex of a carboxyl-modified synthetic rubber latex or synthetic resin emulsion previously neutralized to a pH value of 6 or more and a monomer as represented by the following formula (I) or a mixture of the monomer (I) and copolymerizable ethylenic unsaturated monomer(s) (II) is added to the neutralized seed latex in such proportion that the amount of the monomer (I) corresponds to at least not less than the colloid-equivalent value (absolute value) of the seed latex, in the presence of a radical polymerization initiator:

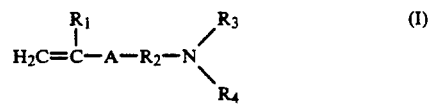

in which
 $R_1$ represents H or $CH_3$;
 $R_2$ represents an alkylene group having from 2 to 5 carbon atoms;
 $R_3$ and $R_4$ each represent H or an alkyl group having from 1 to 5 carbon atoms;
 A represents

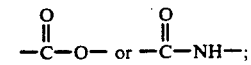

and $R_1$, $R_2$ and $R_4$ are so selected that the monomer is slightly soluble or insoluble in water.

DETAILED EXPLANATION OF THE INVENTION

The present invention is characterized by the employment of a high polymer latex having an amphoteric ion-composite structure. Such functional latex is prepared by seed polymerization of a carboxyl-modified anionic seed latex and other monomers followed by quaternation of the resulting seed polymer. The thus prepared functional latex has a large number of cationic groups as densely distributed on the surfaces of the latex grains, and it has amphoteric ions and is cationically charged on the average.

Since it is prepared by seed polymerization, the functional latex of the present invention has a composite-layered structure and it displays the characteristics of the synthetic rubber or resin used as the seed latex.

Since the functional latex has amphoteric ions, it may well be adsorbed to oppositely charged fine fibers or filler in water during the papermaking process. Additionally, as the latex grains themselves have an ionic interaction therebetween, the fixability and the fused strength of the latex grains are strong during the papermaking and drying steps. Accordingly, the adhesiveness of the latex in the paper prepared is high and the paper strength thereof is improved.

The papermaking procedure is effected under an acidic or neutral condition. For example, it is stable at pH of from 4 to 9.

The papermaking process of the present invention does not require any secondary treatment such as impregnation. Further, it is free from a drawback of binder migration in drying. Accordingly, the excellent producibility of the present invention can be attained only by the primary treatment of adding the particular polymer latex to the paper stock.

The method of preparing the polymer latex which is employed in the papermaking process of the present invention is described in Japanese Patent Application No. 62-304460. The content will be explained hereunder.

As the synthetic rubber latex or synthetic resin emulsion for use in the present invention, anyone known in the technical field can be employed.

As examples of the synthetic rubber latex usable in the present invention, there are mentioned carboxyl-modified latexes of styrene-butadiene rubber (SBR), methyl methacrylate-butadiene rubber (MBR), acrylonitrile-butadiene rubber (NBR) or a rubber comprising the said rubber and other monomer component(s) ($\alpha$), as well as chloroprene rubber (CR) or isoprene rubber (IR). As examples of the synthetic resin emulsion also usable in the present invention, there are mentioned carboxyl-modified emulsions of polymers or copolymers of acrylates, vinyl acetate, vinyl chloride or styrenes, as well as ethylene-vinyl acetate copolymers or ethylene-vinyl chloride copolymers.

The particular monomers for use in the present invention include the monomers represented by the general formula (I) and ethylenic unsaturated monomers (II) which are copolymerizable with the monomers (I).

As examples of the monomers of the formula (I), there are mentioned diethylaminoethyl acrylate, diethylaminoethyl methacrylate, dipropylaminoethyl acrylate, dipropylaminoethyl methacrylate, dibutylaminoethyl methacrylate, t-butylaminoethyl (meth)acrylate, diethylaminopropyl-methacrylamide, dipropylaminopropyl-methacrylamide, dipropylaminopropyl-acrylamide, dibutylaminopropyl-methacrylamide and dibutylaminopropyl-acrylamide.

Other ethylenic unsaturated monomers (II) which are copolymerizable with the monomers (I) include, for example, hydrophobic monomers such as acrylates, methacrylates, acrylonitriles, styrenes or vinyl acetate, as well as crosslinking monomers such as N,N'-methylenebisacrylamide, diallyl phthalate, divinylbenzene and (poly)ethylene glycol di(meth)acrylates.

The amounts of the above-mentioned raw materials to be employed in accordance with the present invention are as mentioned below.

The proportion of the monomer of the formula (I) to the seed latex is approximately from 5 to 50% by weight, preferably from 10 to 30% by weight.

In general, ordinary carboxyl-modified latexes have a colloid-equivalent value of from $-0.2$ to $-0.1$ meq/g. Accordingly, if the proportion of the monomer of the formula (I) to be employed in the present invention is less than 5% by weight, a stable cationic latex could not be obtained as the amount of the cationic groups is too small. On the contrary, however, if it is more than 50% by weight, the cationic groups would be economically disadvantageously excessive.

The colloid-equivalent value is obtained by the method mentioned below.

95 ml of a distilled water is put in a beaker, 5 ml of a 1000-ppm solution of a sample is added thereto, the content is adjusted to have a pH value of 4.0 with 1%-HCl, and the whole is stirred for about one minute. Next, two or three drops of a solution of Toluidine Blue indicator are added to the resulting blend, which is then titered with N/400 PVSK. The titration speed is 2 ml/min. The time when the color of the test water changes from blue to red and the changed color is kept as it is for 10 seconds or more is the final point. The colloid-equivalent value is calculated from the following formula:

Colloid-Equivalent Value (meq/g) =

$$\frac{(\text{Amount of Sample Titration} - \text{Amount of Blank Titration}) \times F}{2}$$

In the formula, F indicates a factor.

The amount of the monomer (II) to be used in the invention can be determined in accordance with the glass transition point or other physical properties of the intended latex. In general, it may be from 0 to about 40% by weight to the monomer (I). The polymerization is effected by seed polymerization, where the pH value of the polymerization system is made to be 6 or more, after the seed latex is diluted or is not diluted with water, and the above-mentioned monomers are added to the system and stirred at a temperature of 20° to 80° C. in the presence of a radical polymerization initiator for seed-polymerization.

If the pH value of the polymerization system is less than 6, the system would gel when the monomers are added thereto or when the monomers are polymerized and, as a result, a stable emulsion could not be obtained. Although the polymerization temperature is not specifically defined under normal pressure, it falls practically within the range of from 20° to 80° C., preferably from 30° to 60° C.

In the polymerization step, an additional surfactant would not be specifically necessary but may be added to the polymerization system if the content is insufficient.

The radical polymerization initiator for use in the present invention may be any one employable in conventional emulsion polymerization.

For instance, there are mentioned inorganic peroxides such as ammonium persulfate, potassium persulfate or hydrogen peroxide; aliphatic azo compounds such as azobisisobutyronitrile, 2,2'-azobis(2,4-dimethylvaleronitrile), 2,2'-azobis(2-amidinopropane)hydrochloride or azobis(N,N'-dimethyleneisobutylamidine)-hydrochloride; benzoyl peroxide; hydroperoxides such as t-butyl-hydroperoxide, diisopropylbenzene-hydroperoxide or cumene-hydroperoxide; and redoxes comprising a combination of the above-mentioned peroxide and a reducing agent such as ascorbic acids, polyvalent metal salts, acidic sodium sulfite or sodium formaldehyde-sulfoxylate.

The amount of the polymerization initiator to be used in the polymerization process is approximately from 1.0 to 5.0% by weight to the monomers. The polymerization may be conducted by either a batch-wise system or a continuous system.

Next, the resulting polymer is neutralized with an acid or a salt or is quaternary-ammoniated with an ordinary quaternating agent, whereby a cationic polymer emulsion where the cationic groups are distributed highly densely on the surfaces of the latex grains is obtained.

For cationation, an acid, salt or quaternizing agent is added to the seed polymer in an amount equivalent to the monomer (I), with stirring at room temperature, whereupon neutralization finishes instantly and quaternization finishes generally in approximately from 5 to 30 minutes.

The acid employable for the process includes inorganic acids such as hydrochloric acid or sulfuric acid and organic acids such as acetic acid, adipic acid, citric acid or formic acid; the salt includes acidic salts such as sodium hydrogensulfate or sodium dihydrogenphosphate; and the quaternizing agent includes alkyl halides such as methyl chloride, ethyl chloride, methyl bromide or methyl iodide and other ordinary alkylating agents such as dimethyl sulfate or diethyl sulfate.

The following examples are intended to illustrate the process of a polymer latex of the present invention in more detail.

PREPARATION EXAMPLE 1:

701.3 g of a carboxyl-modified SBR latex (pH 8.3; solid content 48%; anion colloid-equivalent value −0.18 meq/g), 0.4 g of N,N'-methylenebisacrylamide and 159.7 g of water were put in a flask equipped with a stirrer. With fully stirring, 37.5 g of diethylaminoethyl methacrylate (cation colloid-equivalent value of 0.51 meq/g, as quaternated dimethyl sulfate) was dropwise added thereto through a dropping funnel and thereafter the content in the flask was allowed to stand as it was for one hour with blowing $N_2$ gas thereinto. Afterwards, 80 g of 1% aqueous potassium persulfate solution was added to the reaction mixture, which was then heated up to 50° C. for polymerization. The polymerization was finished in about 2 hours.

30 g of dimethyl-sulfuric acid which is equivalent to the amount of the diethylaminoethyl methacrylate was dropwise added to the polymer latex with stirring for quaternation to obtain an amphoteric polymer latex.

PREPARATION EXAMPLE 2:

The same operation as in Example 1 was repeated, except that N,N'-methylenebisacrylamide was not added, and a stable amphoteric polymer latex was obtained.

PREPARATION EXAMPLE 3:

530 g of a carboxyl-modified MBR latex (pH 8.8; solid content 45%; anion colloid-equivalent value −0.20 meq/g) and 55 g of water were put in a flask equipped with a stirrer. With well stirring, 20 g of methyl methacylate and 40 g of diethylaminoethyl methacrylate were dropwise added thereto through a dropping funnel and thereafter the content was allowed to stand as it was for one hour with blowing $N_2$ gas thereinto. Afterwards, 120 g of 1% potassium persulfate was added to the reaction mixture, which was then heated up to 40° C. for polymerization. The polymerization was finished in about 3 hours.

32 g of dimethyl-sulfuric acid which is equivalent to the amount of the diethylaminoethyl methacrylate was dropwise added to the polymer latex with stirring for quaternation to obtain an amphoteric polymer latex.

PREPARATION EXAMPLE 4:

The same operation as in Example 3 was repeated, except that the methyl methacrylate was replaced by vinyl acetate, and a stable amphoteric polymer latex was obtained.

PREPARATION EXAMPLE 5:

The same operation as in Example 1 was repeated, except that the diethylaminoethyl methacrylate was replaced by t-butylaminoethyl methacrylate, and a stable amphotenic polymer latex was obtained.

Next, the method of adding the polymer latex to a paper stock to be used for the papermaking method of the present invention will be mentioned below.

The polymer latex is effectively added to the paper stock (pulp and filler) in an amount of approximately from 2.5 to 30% by weight as the solid content. It may be more than 30% by weight, but the fixability would lower and the effect would thereby be lowered.

The amount of the polymer latex to be added to the paper stock is selected in accordance with the papermaking condition and the characteristics of the paper products to be prepared. It is preferred to previously determine the amount by a preliminary test where the range for sufficient fixation is measured, for example, by the use of a dynamic drainage jar.

The polymer latex may fix to the paper stock almost completely in an amount of up to 20% by weight. It is preferred that the polymer latex is previously diluted with water to 1/10 or less prior to being added to the paper stock.

In the papermaking method of the present invention, a fixing agent such as aluminum sulfate is not specifically necessary but is preferably employed along with a retention-improving agent for the purpose of improving the retention of fine fibers and fillers in the method. The position of adding the agent is preferably before the machine chest or fun pump.

Where a retention-improving agent is employed, it is preferably added at the position before and/or after the screen or near the head box.

EXAMPLE 1

A fixation test was effected, where the latex mentioned below was added to the paper stock mentioned below. The conditions were as follows:

(1) Pulp Used: 1% LBKP Slurry (degree of beating: 400 ml C.S.F.)

(2) The amphoteric latex prepared in preparation Example 1 was used as the polymer latex.

(3) Test Method: The pulp slurry was put in a dynamic drainage jar and a determined amount of the polymer latex was added thereto. Then the whole was stirred at 800 rpm for 230 seconds and filtered through a 150-mesh screen. The colloid-equivalent value of the resulting filtrate was obtained on the basis of the definition mentioned above, and the fixation percentage was calculated therefrom.

(4) The results obtained are shown in Table 1 below.

EXAMPLE 2

A paper-strength improving test was effected, using a paper made from a polymer latex-added paper stock. The papermaking conditions were as follows:

(1) Pulp Used: NBKP—(degree of beating: 400 ml/700 ml C.S.F.) LBKP—(degree of beating: 400 ml/700 ml C.S.F.)

(2) The product prepared in preparation Example 1 was used as the polymer latex. The amount added was 0, 5 or 10 parts by dry weight to the pulp.

(3) Weight of Paper (Base weight): 60 g/m$^2$ (4) Papermaking Machine Used: TAPPI Sheet Machine (5) Press: 5 kg/cm$^2$ × 15 min.

(6) Drying: 120° C. × 2 min in drum drier.

(7) The relative breaking strength was measured. The results obtained are shown in Table 2 below.

EXAMPLE 3

A paper made from a polymer latex-added paper stock having a high filler content was tested under the conditions mentioned below. As the polymer latex, the product produced in preparation Example 1 was used.

(1) Raw Material:

Pulp: NBKP (400 ml CSF)
Pigment: Aluminium Hydroxide
Blend Ratio: NBKP/Aluminium Hydroxide of 15/85 (by weight)
Amount of Latex Added: 0 to 10% by dry weight to pulp
Acculac MG1024 (filler retention-improving agent, trade name of Mitsui-Cyanamid, Ltd.): 0.1% by dry weight to pulp
Synthetic Formation Aid (polyethylene oxide): 0.1% by dry weight to pulp (2) Papermaking Conditions:
Base Weight: 200 g/m$^2$
Press: 3 kg/cm$^2$ × 15 min
Drying: 120° C. × 2 min in drum drier 130° C. × 5 min in hot-air drier
Order of Addition: Pulp→Latex→Acculac MG1024→Synthetic Formation Aid→Papermaking (3) The test results are shown in Table 3 below.

In accordance with the papermaking method of the present invention, a paper having a noticeably improved paper-strength is prepared. This invention may be used in the fields mentioned below:

Wet non-woven fabric, inorganic fiber paper, high filler paper, ceramic paper, printing paper for posters, map or label, polishing paper, masking tape, adhesive tape base, oil-proof wrapping paper, wall paper base, imitation leather paper base, gasket paper, bottom or core for shoe, packing, floor mat base, etc.

TABLE 1

| Latex Added (wt %/Pulp) | Fixation (%) |
|---|---|
| 2.5 | 100 |
| 5 | 100 |
| 10 | 100 |
| 15 | 100 |
| 20 | 100 |
| 30 | 96 |

TABLE 2

| Pulp Used | Degree of Beating (mlCSF) | Latex Added (wt %/Pulp) | Relative Breaking Strength |
|---|---|---|---|
| NBKP | 400 | 0 | 4.6 |
|  |  | 5 | 5.9 |
|  |  | 10 | 6.4 |
| NBKP | 700 | 0 | 1.0 |
|  |  | 5 | 3.0 |
|  |  | 10 | 4.4 |
| LBKP | 400 | 0 | 2.8 |
|  |  | 5 | 3.5 |
|  |  | 10 | 4.3 |
| LBKP | 700 | 0 | 0.1 |
|  |  | 5 | 0.9 |
|  |  | 10 | 1.5 |

TABLE 3

| No | Latex | Acculac MG 1024 | Formation Aid | Base Weight (g/m$^3$) | Al(OH)$_3$ in Paper (%) | Bursting Strength (kg/cm$^2$) | Relative Breaking Strength |
|---|---|---|---|---|---|---|---|
| A | 0 | 0.1 | 0.1 | 154 | 82 | 0.11 | 0.07 |
| B | 2.5 | 0.1 | 0.1 | 138 | 78 | 0.60 | 0.43 |
| C | 5 | 0.1 | 0.1 | 131 | 77 | 0.71 | 0.54 |
| D | 10 | 0.1 | 0.1 | 125 | 75 | 0.88 | 0.70 |
| E | 10 | — | 0.1 | 67 | 51 | 1.54 | 2.30 |
| F | 10 | — | — | 70 | 51 | 1.62 | 2.31 |

Remarks: As to NO. E, F, Retention Aid is not added, so retention of Al(OH)$_3$ in paper is small. Furthermore, apparent Strength is high on account of increased fiber in paper.

What is claimed is:

1. In a method of preparing a paper having a reinforced strength wherein a polymer latex is added to a paper stock in an amount of from 2.5 to 30% by weight, the improvement wherein the polymer latex is prepared by neutralizing a seed polymer emulsion with an acid or a salt or by quaternizing it with a quaternizing agent, the surfaces of the emulsion seed thereby being provided with a large number of cationic groups, and where the seed polymer emulsion is formed by adding a monomer represented by the following formula (I) or a mixture of the monomer (I) and copolymerizable ethylenic unsaturated monomer(s) (II) to a seed latex of a carboxyl-modified synthetic rubber latex or a carboxylated synthetic resin emulsion and polymerizing them:

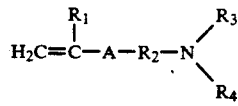

in which
R₁ represents H or CH₃;
R₂ represents an alkylene group having from 2 to 5 carbon atoms;
R₃ and R₄ each represent H or an alkyl group having from 1 to 5 carbon atoms;
A represents

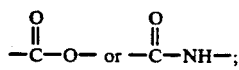

and
R₁, R₃ and R₄ are so selected that the monomer is substantially insoluble in water,
the proportion of monomer I to the seed latex being at least 5% weight.

2. The papermaking method as claimed in claim 1, in which the amount of the monomer of the formula (I) is 5 to 50% by weight of the carboxyl-modified latex.

3. In a method of preparing a paper having a reinforced strength wherein a polymer latex is added to a paper stock in an amount of from 2.5 to 30% by weight, the improvement wherein the polymer latex has a large number of cationic groups and is prepared by neutralizing a seed polymer emulsion with an acid or a salt or by quaternizing it with a quaternizing agent, whereby the surfaces of the emulsion seed are provided with a large number of cationic groups, where the seed polymer emulsion is one obtained by polymerizing a seed latex of a carboxyl-modified synthetic rubber latex or carboxylated synthetic resin emulsion previously neutralized to a pH value of 6 or more and a monomer represented by the following formula (I) or a mixture of the monomer (I) and copolymerizable ethylenic unsaturated monomer(s) (II) is added to the neutralized seed latex in such proportion that the amount of the monomer (I) corresponds to 5 to 50% by weight of the seed latex, in the presence of a radical polymerization initiator:

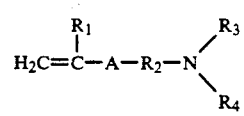

in which
R₁ represents H or CH₃;
R₂ represents an alkylene group having from 2 to 5 carbon atoms;
R₃ and R₄ each represent H or an alkyl group having from 1 to 5 carbon atoms;
A represents

and
R₁, R₃ and R₄ are so selected that the monomer is substantially insoluble in water.

4. The method according to claim 1 wherein the monomer of formula (I) is selected from the group consisting of diethylaminoethyl acrylate, diethylaminoethyl methacrylate, dipropylaminoethyl acrylate, dipropylaminoethyl methacrylate, dibutylaminoethyl methacrylate, t-butylaminoethyl (meth)acrylate, diethylaminopropyl-methacrylamide, dipropylaminopropyl-methacrylamide, dipropylaminopropyl-acrylamide, dibutylaminopropyl-methacrylamide and dibutylaminopropyl-acrylamide.

5. The method according to claim 3 wherein the monomer of formula (I) is selected from the group consisting of diethylaminoethyl acrylate, diethylaminoethyl methacrylate, dipropylaminoethyl acrylate, dipropylaminoethyl methacrylate, dibutylaminoethyl methacrylate, t-butylaminoethyl (meth)acrylate, diethylaminopropyl-methacrylamide, dipropylaminopropyl-methacrylamide, dipropylaminopropyl-acrylamide, dibutylaminopropyl-methacrylamide and dibutylaminopropyl-acrylamide.

* * * * *